United States Patent
Huo

(10) Patent No.: US 7,497,405 B2
(45) Date of Patent: Mar. 3, 2009

(54) ESL AND P.V.C. PIPE SUPPORT

(76) Inventor: Weixiong Huo, 7497 Coral River Dr., Las Vegas, NV (US) 89131-2642

( * ) Notice: Subject to any disclaimer, the term of this patent is extended or adjusted under 35 U.S.C. 154(b) by 0 days.

(21) Appl. No.: 11/517,472

(22) Filed: Nov. 6, 2006

(65) Prior Publication Data

US 2008/0105794 A1    May 8, 2008

(51) Int. Cl.
*F16L 3/22* (2006.01)
(52) U.S. Cl. .................. 248/68.1; 248/49; 248/175
(58) Field of Classification Search .......... 248/49, 248/67.7, 68.1, 671, 175, 153, 80, 89; 211/85.3, 211/106, 112, 181.1, 85.31, 126.9; 42/94; 43/21.2
See application file for complete search history.

(56) References Cited

U.S. PATENT DOCUMENTS

| | | | | |
|---|---|---|---|---|
| 471,424 A | * | 3/1892 | Hov ........................ 248/163.1 |
| 2,661,172 A | * | 12/1953 | Needham ..................... 248/671 |
| 2,697,575 A | * | 12/1954 | Eames ........................ 248/175 |
| 2,760,742 A | * | 8/1956 | Alger ......................... 248/107 |
| 2,798,393 A | * | 7/1957 | Currin ........................ 81/176.1 |
| 3,145,960 A | * | 8/1964 | Langdon ..................... 248/671 |
| 3,182,942 A | * | 5/1965 | Flanigan ...................... 248/107 |
| 5,154,379 A | * | 10/1992 | Parish ....................... 248/117.6 |
| 5,876,001 A | * | 3/1999 | Wiebe ......................... 248/68.1 |
| 6,364,277 B1 | * | 4/2002 | Miller ......................... 248/676 |
| 6,471,180 B1 | * | 10/2002 | Cunningham ................ 248/640 |
| 6,585,224 B1 | * | 7/2003 | Schmidt ...................... 248/640 |
| 6,889,944 B2 | * | 5/2005 | Brandzel et al. ............ 248/68.1 |
| 7,090,173 B2 | * | 8/2006 | Lussier ......................... 248/58 |
| 7,093,727 B2 | * | 8/2006 | Musico ..................... 211/105.1 |
| 7,186,095 B2 | * | 3/2007 | Skinner ....................... 417/360 |

* cited by examiner

*Primary Examiner*—Amy J. Sterling
(74) *Attorney, Agent, or Firm*—Weiss & Moy, P.C.

(57) ABSTRACT

A support of this type comprising of two generally M-shaped saddle members held together by a connecting member such as a rod or part spot welds. The feet or foot portions of the outboard inclined legs of the generally M-shaped saddle members are to be flat with a hole in two of the off-setting feet so as to hold the said support in place with nails or staple. The saddle support is designed to hold electrical conduit and fittings in place and also it is primarily to be used to protect fittings. The body of the support is made of 5 mm-6 mm diameter iron rod.

Since certain changes may be made in the foregoing disclosure without departing from the scope of the invention herein involved, it is intended that all matter contained in the above description and depicted in the accompanying drawings be construed in an illustrative and not in a limiting sense.

2 Claims, 6 Drawing Sheets

Double saddles support to support ESL or EFL and PVC pipe also to protect PVC Adapter.

Double saddles support to EMC and PVC pipe also to protect PVC Adapter.

Double saddle support to support each end of the PVC pipes and also to protect PVC coupling.

ESL AND P.V.C. PIPE SUPPORT

CROSS-REFERENCE TO RELATED APPLICATION

Not applicable

FEDERALLY SPONSORED RESEARCH

Not applicable

SEQUENCE LISTING OR PROGRAM

Not applicable

BACKGROUND OF THE INVENTION

1. Field of Invention

The purpose of this invention is to support and protect electrical conduits, PVC plastic pipes, couplings, connectors and adaptors poured in concrete.

2. Background of Invention

The design of this invention is to protect and support PVC fittings being damaged from workers and people stepping or tripping on the PVC electrical conduit, couplings, connector, adaptors and ESL fittings in the concrete pour.

Saddled so that the fitting is firmly in place between support on each end also underneath the conduit.

DRAWINGS

Reference Numerals

1&2 are generally M-shaped saddle members each with a generally U-shaped saddle portion.

3 is part of a connecting member extending between and underneath the generally M-shaped saddle members.

4 are the feet which are slightly over bent 1 mm as not to lay completely flat on a surface. The feet are shown as the foot portions of the legs 5 of the generally M-shaped saddle members. (In Addition, the feet will have offsetting feet straps overlapping on the surface with two 4 mm-4.5 mm holes on the flat part of the foot strap so that a nail, screw, or a staple can be used to hold the pipe support in place (FIG. 2)).

5 are the outboard inclined legs to support the generally M-shaped saddle members. The leg material will be made of 5 mm-6 mm diameter rod made of iron.

6 is the connecting member, the length of which will vary according to the size of the support held together by iron rod spot welds.

7 is another connecting member same as #6 held together by metal or iron part spot welds.

8 are the feet straps overlapping on the surface with two 4 mm-4.5 holes on the feet straps on flat part

DRAWINGS

Figures

9 one hole being punched on flat legs.

DRAWING

VIEW FOR REFERENCE

Figure 1:
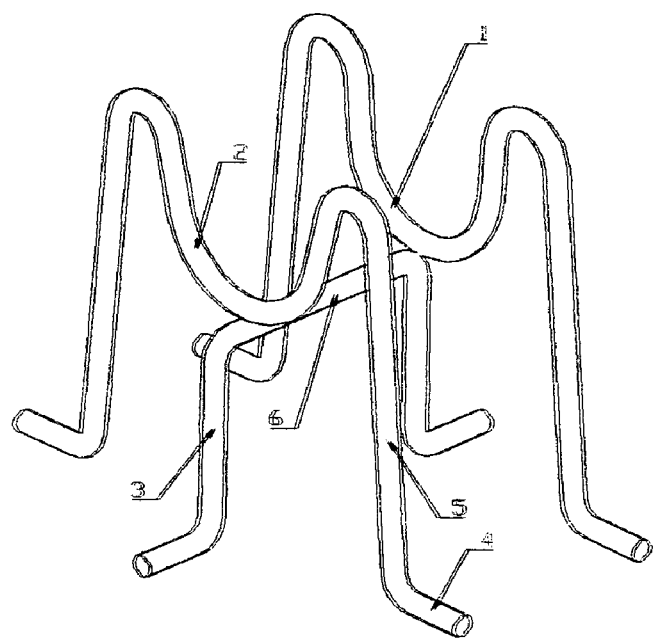
FIG. 1 shows one embodiment of the pipe support.
Figure 1A:
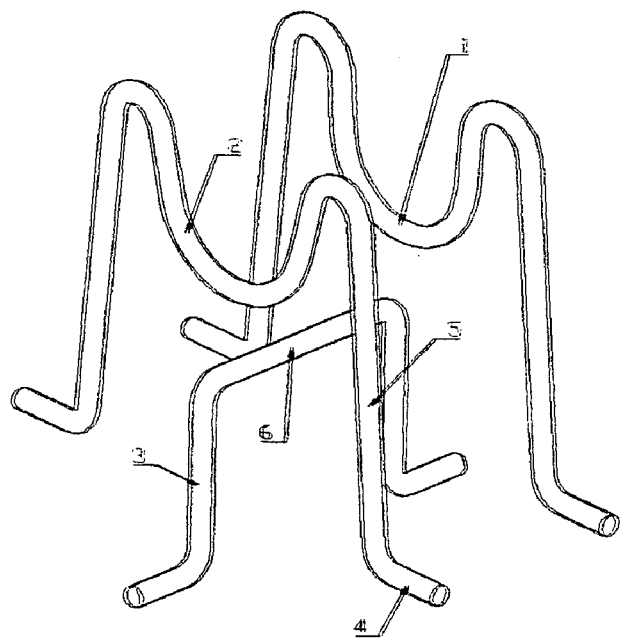
FIG. 1a shows disassembly of FIG. 1.
Figure 2:
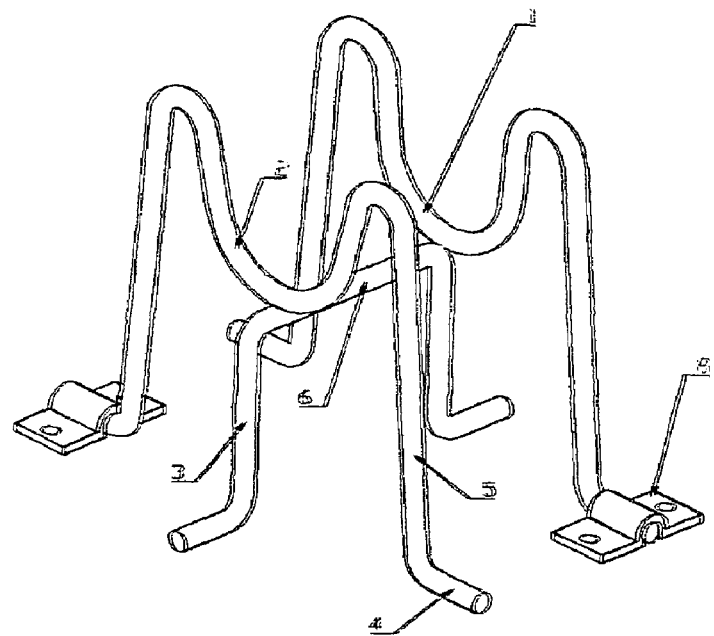
FIG. 2 shows the pipe support of FIG. 1 with a foot strap over a foot portion of an outboard inclined leg.
Figure 2A:
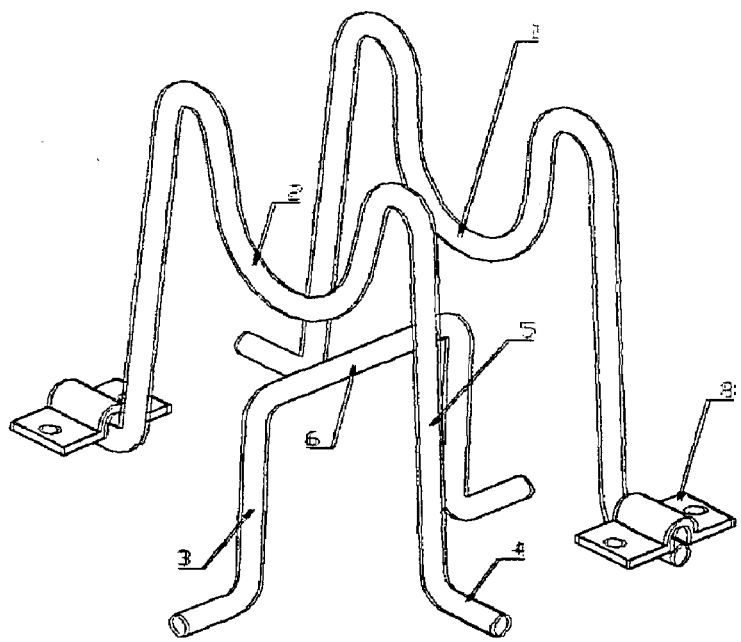
FIG. 2a shows disassembly of FIG. 2.
Figure 3:
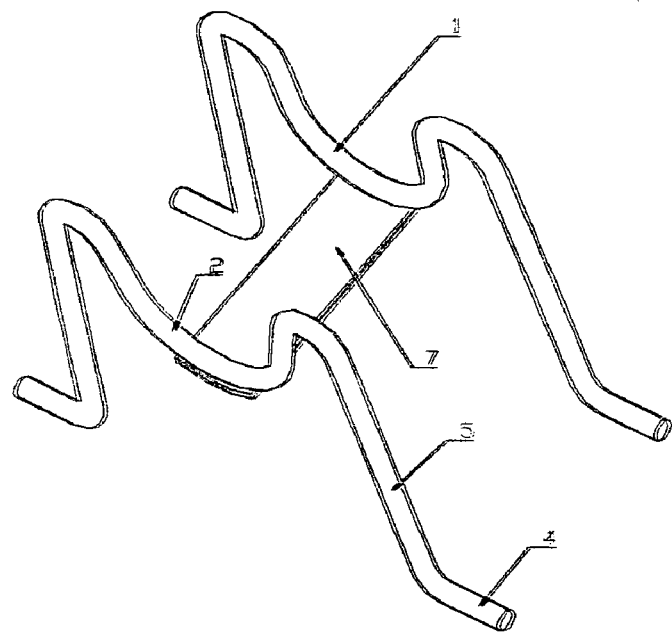
FIG. 3 shows a pair of generally M-shaped saddle members each with a U-shaped saddle portion bonded together by a connecting member.
Figure 3A:
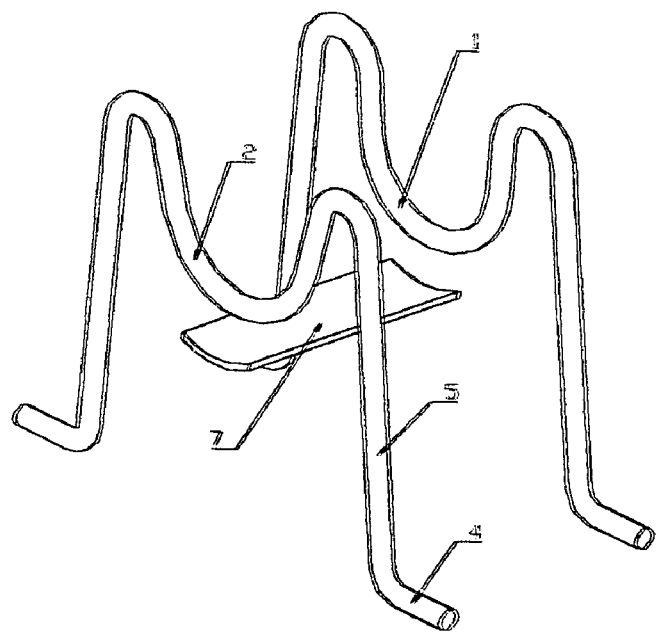
FIG. 3a shows disassembly of FIG. 3.
Figure 4:
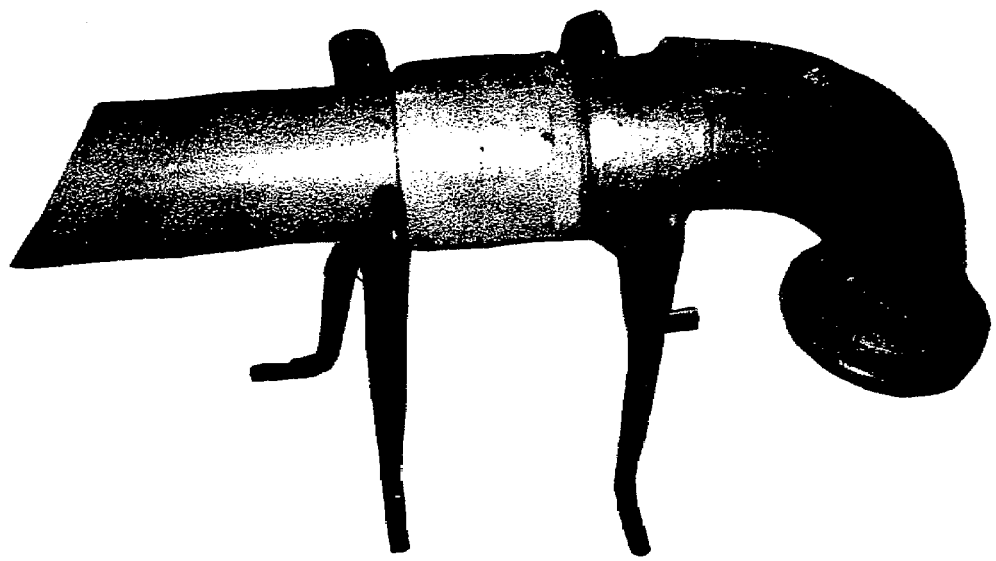

FIG. 4 show support ESL and PVC pipe, Also to protect PVC adapter.

Figure 5:
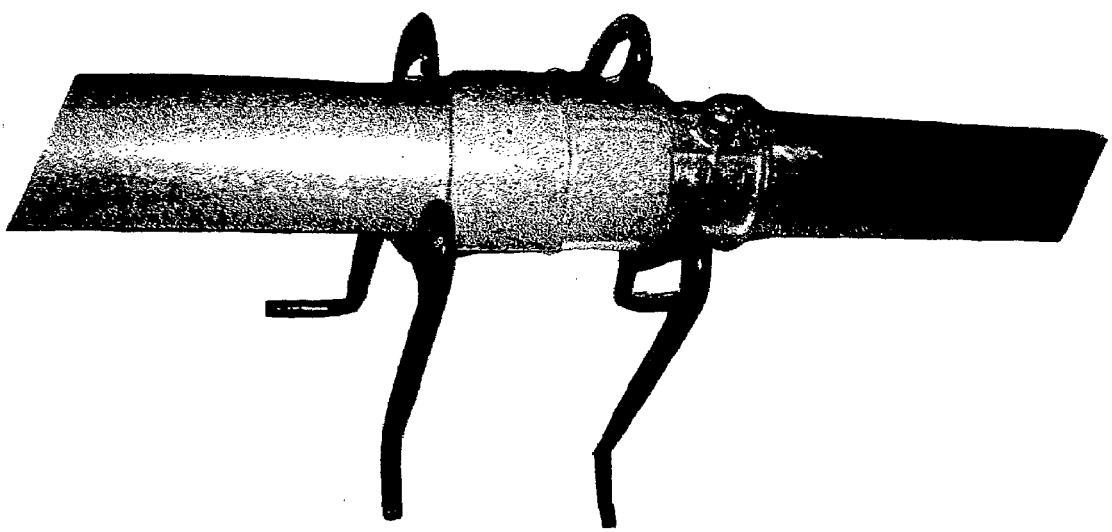

FIG. 5 show support EMC pipe with connector and PVC: pipe also protect PVC adapter.

Figure 6:
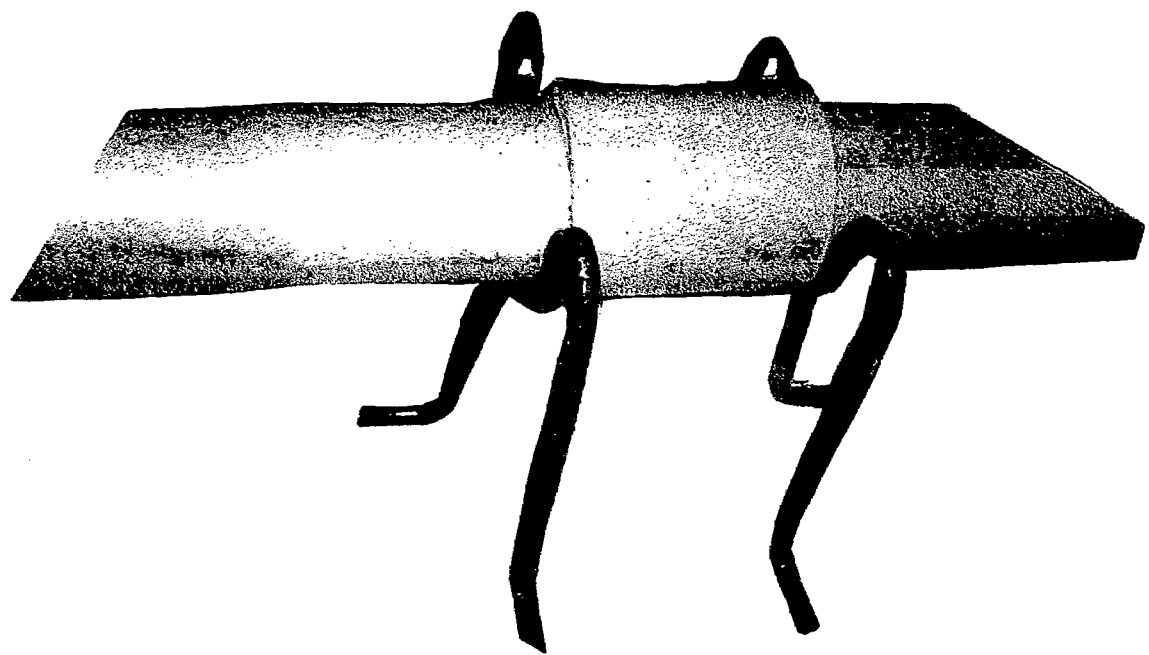

FIG. 6 show support on each end of PVC pipe and protect PVC coupling.

I claim:

1. A pipe support comprising:
a pair of generally M-shaped saddle members in parallel spaced relation each having a pair of outboard inclined horizontally spaced legs with a foot portion at a lower end and a generally U-shaped saddle portion extending from and between said pair of outboard inclined horizontally spaced legs; and
a connecting member that extends between the opposed generally U-shaped saddle portions comprising a pair of outboard upright portions and a raised portion extending from and between said pair of outboard upright portions, the pair of outboard upright portions each having a foot portion that extends outwardly at a lower end and wherein the opposed generally U-shaped saddle portions have an underside and the connecting member is affixed to the underside of the opposed generally U-shaped saddle portions.

2. The pipe support of claim 1 further comprising at least one fastener for attaching at least one of the foot portions of the outboard inclined legs and the connecting member to a mounting surface to support the pipe support in an upright position thereon.

* * * * *